3,340,680
AIR PURIFICATION PROCESS
Joseph E. Fields, Ballwin, and John H. Johnson, Kirkwood, Mo., assignors to Monsanto Company, St. Louis, Mo., a corporation of Delaware
No Drawing. Filed Feb. 1, 1966, Ser. No. 523,972
9 Claims. (Cl. 55—22)

This application is a continuation-in-part of copending application Ser. No. 440,911, filed Mar. 18, 1965, which application is in turn a continuation-in-part of copending application Ser. No. 248,881, filed Jan. 2, 1963, now abandoned.

The present invention relates to methods for treating gases to remove organic substances having harmful or objectionable characteristics. More particularly, this invention relates to methods of removing pathogenic contaminants such as bacteria and virus from oxygen-containing gases such as air.

The term oxygen-containing gas as used herein includes pure oxygen as well as air and any other gaseous mixture containing oxygen.

The precise relationship between environmental contamination and various infectious diseases has not been completely defined. However sanitary control of environmental air has gained wide acceptance as a desirable step in infection prevention programs because it is known that the higher the concentration of pathogens the greater the incidence of disease. Pathogenic contaminants such as bacteria and particularly viruses are difficult to remove from air. Methods have been devised for filtering and scrubbing contaminants such as dust, pollen and odors from air but not for the practical removal of bacteria and virus. The removal of pathogenic contaminants from oxygen containing gases represents an important problem in many areas of our environment including our outer-space environment. The effective removal of pathogenic contaminants from air is of major importance in such areas as hospitals, civil defense shelters, industrial plants, churches, schools, business establishments, bacteriological laboratories, research installations, auditoriums, private homes, underground operations such as mines, aircraft, underwater craft and spacecrafts.

Air purification is particularly critical at present in hospitals and bacteriological laboratories. In bacteriological laboratories the personnel must be protected against critical infection. In hospitals, patients must be protected against recurrence of infection and personnel against initial infection. Civil defense shelters, if not equipped to effectively remove pathogenic contaminants from the air, would be of small value in the event of bacteriological warfare. One major industrial-military area where removal of pathogens from oxygen-containing gases is of primary importance at the present time is the space program. Spacecrafts must be absolutely free from pathogens for the protection of the (a) occupants of the spacecraft, (b) residents of visited planets, if any, and (c) inhabitants of earth upon return of the spacecraft.

In accordance with this invention it has been found that pathogenic contaminants such as viruses and bacteria and also many other objectionable organic substances can be removed from oxygen-containing gases such as air by contacting the contaminated oxygen-containing gas with a composition comprising a small but effective quantity of a polymeric hydrophilic polyelectrolyte having a weight average molecular weight of at least 1000, a degree of polymerization of at least eight, and having a structure derived by the copolymerization of an olefinically unsaturated polycarboxylic acid, or derivative of said acid, with at least one other monomer copolymerizable therewith. Additionally the polyelectrolyte is physically immobilized within the treating apparatus so as to prevent the polyelectrolyte's discharge into the effluent air. Immobilization can be obtained by the use of insoluble polymers. As used in this specification and the appended claims insoluble and insolubility includes three dimensional polymeric materials which will not swell in water to such an extent that they form a stable dispersion or gel in water, nor fragment or dissolve. Insolubility is conveniently achieved in water soluble polymers by cross-linking the polymer chains.

The method of this invention greatly reduces the concentration of pathogens in oxygen-containing gases and thus the rate of disease transference by such gases is greatly decreased. The method of this invention offers improvement over current methods. The contact of pathogenic contaminated, oxygen-containing gas with hydrophilic polyelectrolyte can be achieved with modifications to equipment presently used for air circulation or for air conditioning. Contaminated oxygen-containing gas such as air can be passed over dry polyelectrolyte surfaces or contacted with the polyelectrolyte in a scrubbing system. In some areas polyelectrolyte in the form of filter media of the conventional filter-mat type will be used in place of the normal dust filter, e.g. in room and house air conditioners. In other areas such as underground operations having considerable dust problem, a conventional roughing filter can be employed in series with the polyelectrolyte filter. A filter medium of the conventional filter-mat type especially useful in the dry type operation but having about 100 times the surface area of conventional ion exchange resins can be made from polymers of the invention by a solvent-cast uncollapsed film technique (Craig, J. P., Knudsen, J. P. and Holland, V. F.; Characterizations of Acrylic Fiber Structure, Textile Research Journal, 32, No. 6, 435–448 (1962). In the scrubbing system the finely divided particles of polyelectrolyte can be added to the scrubbing bath, or polyelectrolyte can be deposited on an inert substrate and used in the wet filtering system. When adsorptive capacity of the polyelectrolyte is reached, the adsorbed contaminants, germs, etc., can be removed by destroying the infectious matter by steam or autoclave treatments, chemical treatments with formaldehyde or ethylene oxide and so forth or, alternately, the polyelectrolyte can be washed with a dilute brine or acidic solution to loosen and wash away the contaminants.

Suitable hydrophilic water-insoluble polyelectrolytes for practicing the instant invention contain ionizable hydrophilic groups. Many of the normally suitable polyelectrolytes are water soluble, however even the water soluble polymers can be utilized by introducing sufficient cross links during the preparation of the polymer or by subsequent treatment of the polymer to make the polymer water-insoluble. The cross-linked polymers can be obtained as three-dimensional networks which do not dissolve in water, i.e. are water-insoluble, and which can be used to adsorb contaminants from water. The adsorptive capacity and efficiency of hydrophilic polyelectrolytes can be varied by regulation of the degree of cross-linking of the polymer chains.

By "polyelectrolyte" it is intended to include only polymeric organic substances which, when contacted with an aqueous medium or aqueous alkaline or aqueous acidic medium, will form organic ions having a substantial number of electrical charges distributed at a plurality of positions thereon.

The preferred type of polymeric material useful in the practice of the invention is the equimolar copolymer of an olefinically unsaturated polycarboxylic acid derivative and at least one other monomer copolymerizable therewith, which is cross-linked sufficiently to make the copolymer water-insoluble. The polycarboxylic acid derivative can be maleic anhydride, maleic acid, fumaric acid, itaconic acid, citraconic acid, aconitic acid, the amides of these acids (including partial amides and their salts), the alkali metal, alkaline earth metal, and ammonium salts of these acids, the partial alkyl esters, salts of the partial alkyl esters and the substituted amides of these polycarboxylic acids and their salts. The carboxylic acid, carboxylic acid salt, amide and substituted amide radicals are the groups which contribute to the hydrophilic properties. The hydrophilic properties may be entirely, or in part, due to the comonomer when acrylic acid, acrylamide, acrylic acid salts of alkali metals and ammonium, N-substituted acrylamide and the corresponding derivatives of methacrylic, crotonic or other polymerizable acids are used. When the hydrophilic maleic acid derivatives are used, hydrophobic comonomers can be used, for example, ethylene, propylene, isobutylene, octene-1, styrene, α-methylstyrene, vinyl acetate, vinyl chloride, vinyl formate, vinyl alkyl ethers, alkyl acrylates and alkyl methacrylates.

In the practice of this invention the dibasic acid derivatives of the copolymers can be maleic acid, maleic anhydride, sodium maleate, potassium maleate, ammonium maleate, calcium maleate, monosodium maleate, monopotassium maleate, monoammonium maleate, monocalcium maleate, a monoalkyl maleate, maleic acid amide, the partial amide of maleic acid, the N-alkyl substituted maleic acid amide, the N-aminoethyl maleamide, the N-aminoethyl maleimide, the alkylaminoalkyl maleamides, and the corresponding derivatives of itaconic, citraconic, fumaric and aconitic acids. Any of the said polybasic acid derivatives may be copolymerized with any of the other monomers described above, and any other which forms a copolymer with dibasic acid derivatives in equimolar proportions. The polybasic acid derivatives can be copolymers with a plurality of comonomers, in which case the total molar proportions of the comonomers will be equimolar with respect to the polybasic acid derivatives. Although these copolymers can be prepared by direct polymerization of the various monomers, frequently they are more easily prepared by an after reaction of other copolymers. For example, copolymers of maleic anhydride and another monomer can be converted to maleic acid copolymers by reaction with water and to salts of the copolymers by reaction with alkali metal compounds, alkaline earth metal compounds, amines, ammonia, etc.

Certain of the hydrophilic derivatives of unsaturated polycarboxylic acids are polymerizable in less than equimolar proportions with certain of the less hydrophobic comonomers, for example, vinyl formate and vinyl acetate or with monomers with ionizable groups, such as acrylic acid, the alkali metal and ammonium salts of acrylic acid, acrylamides, and the various N-substituted acrylamides, methacrylic acid, the alkali metal and ammonium salts of methacrylic acid, methacrylamide and the various N-substituted methacrylamides, crotonic acids and the alkali metal and ammonium salts of crotonic acids, the crotonamides and the N-substituted crotonamides, and vinyl phosphonic acid. The hydrophilic derivatives of polycarboxylic acids include the half alkyl esters of maleic acid, and the partial alkyl esters of fumaric, itaconic, citraconic and aconitic acids. When less than 50 mole percent of these hydrophilic polybasic acid derivatives are used, and especially with the hydrophobic monomers, such as vinyl acetate and vinyl formate, the minimum proportion of polybasic acid derivative is that which will render the copolymer hydrophilic in its overall effect, thus we prefer to employ at least 20 mole percent of the monomer of the polybasic acid derivative.

Another modification of the copolymers of the various unsaturated polycarboxylic acid derivatives are those wherein more than 50 percent of the polycarboxylic acid derivative is copolymerized therein. This type, of which fumaric acid and itaconic acid are examples of the hydrophilic monomer, can involve a wide variation with respect to the nonhydrophilic monomer, ethylene, propylene, isobutylene, octene-1, styrene, α-methylstyrene, vinyl acetate, vinyl formate, vinyl alkyl ethers, alkyl acrylates and alkyl methacrylates being useful. If desired, the comonomer can be one which contributes to the hydrophilic property, for example, vinyl alcohols, acrylic acid, methacrylic acid, acrylamide, methacrylamide and the various amides which have alkyl, aminoalkyl, or alkylaminoalkyl substituents on the nitrogen atom. The proportions of these various comonomers contemplate the use of more than 50 mole percent of the polybasic acid derivative and less than 50 mole percent of the comonomer. The comonomer can be used in relatively small proportions, depending upon the hydrophilic or hydrophobic nature of the comonomer; for certain applications of these polymers in the practice of our invention, such as columnar operation, sufficient total hydrophilic groups in both monomers must be present to render the resultant copolymer water wettable under the conditions of use. This type of copolymer may involve a plurality of the polycarboxylic acid derivatives and/or a plurality of the comonomers.

Other useful polymeric polyelectrolytes are the homopolymers of polymerizable polycarboxylic acids and the water-soluble derivatives thereof, e.g. homopolymeric mono-ethyl fumarate, homopolymeric fumaramide, the half ammonium salt, half methyl ester of homopolymeric fumaric acid, etc.

Other useful polymeric polyelectrolytes are the polymers which derive their hydrophilic characteristics from the presence of amine radicals. These include the polyvinylpyridines, the poly-N-vinyl amines, the poly-N-allylamines, the heterocyclic nitrogen compounds wherein the nitrogen is a tertiary amino group, and the salts (e.g. acetates and hydrochlorides). The vinyl amines can be present in copolymers with vinyl acetate, vinyl formate, vinyl chloride, acrylonitrile, styrene, esters of acrylic acid, esters of methacrylic acid, and other monomers capable of existing in copolymeric form with the N-vinyl amines. Included within the scope of this type of polymeric polyelectrolyte are the polymers of products derived by the hydrolysis of amides and imides, such as N-vinyl formamide, N-vinylacetamide, N-vinylbenzamide, N-vinyl-N-methylformamide, N-vinyl-N-methylacetamide, N-vinyl-N-methylbenzamide, N-vinylphthalimide, N-vinyl-succinimide, N-vinyldiformamide, and N-vinyldiacetamide. Similarly, copolymers of these various amides with other polymerizable monomers can be first prepared and subsequently hydrolyzed to the corresponding vinyl amine derivatives. The polyallylamines and polymethallylamines and copolymers thereof can be prepared by copolymerizing acrylonitrile or methacrylonitrile, alone or in the presence of other monomers, and then by hydrogenation converted into amine-containing polymers.

Another important class of polymeric polyelectrolytes includes the polymers of vinyl substituted amides, such as N-vinyl-N-methylformamide, N-vinyl-formamide, N-vinylacetamide, and other vinyl substituted amides such as N-vinyl pyrrolidone, the polymers of which have hydrophilic characteristics. Useful compounds include homopolymers and copolymers with vinyl acetate, acrylonitrile, isobutylene, ethylene, styrene, vinyl chloride, vinylidene chloride, vinyl-formate, vinyl alkyl ethers, alkyl acrylates, alkyl methacrylates, and copolymers with the more hydrophilic monomers, such as acrylic acid, methacrylic acid, acrylamide, methacrylamide, the various substituted amides, monoalkyl esters of maleic acid, the aminoalkyl esters of acrylic or other polymerizable acids, the alkali metal and ammonium salts of acrylic or other polymerizable acids, and other polymerizable compounds with ionizable functions.

As described above in connection with the various types of polyelectrolytic polymers suitable for the practice of this invention, the hydrophilic polymer can be prepared directly by the polymerization or copolymerization of one or more of the various available organic monomers with aliphatic unsaturation, if the said compounds contain a hydrophilic group, especially for example, carboxyl groups. Generally, more types of polyelectrolytic polymers can be prepared by subsequent reactions of polymers and copolymers. For example, polymers containing nitrile groups can be hydrolyzed to form amide and carboxy containing polymers or hydrogenated to form amine containing polymers. Similarly copolymers of maleic anhydride and vinyl acetate can be hydrolyzed to form polymers containing hydrophilic lactone rings. Other hydrophilic polymers can be prepared by the hydrolysis of copolymers of vinyl acetate wherein the acetyl groups are removed leaving hydroxy groups which promote the hydrophilic effect of polyelectrolytic groups present. By other reactions non-hydrophilic polymers can be converted into lactam or amide containing polymers which are more hydrophilic. Polyvinyl alcohol, not in itself a polyelectrolyte, can be converted into polyelectrolytes by esterification with dibasic acids, one of said carboxylic acid groups reacting with the alcohol radical and the other providing the hydrophilic characteristics by a carboxy group on the side chain. Still other types of polymers can be prepared by reacting halogen containing polymers, for example, the polymers or copolymers of vinyl chloroacetate or vinyl chloroethyl ether, with amines to form amine salt radicals and quaternary ammonium radicals whereby hydrophilic characteristics are introduced into what otherwise would be a hydrophobic polymer. Other hydrophilic polymers can be prepared by the ammonolysis of ketone-containing polymers, for example, polyvinyl methyl ketone. Other types of polymers prepared by the subsequent reaction of previously prepared polymers have been explained above in connection with the vinyl amine polymers by hydrolysis of the N-vinyl amides.

Copolymers are conveniently identified in terms of their monomeric constituents. The names so applied refer to the molecular structure and are not limited to the polymers prepared by the copolymerization of the specified monomers. In many instances the identical copolymers may be prepared from other monomers and converted by subsequent chemical reaction to the desired copolymer.

Thus, the various polyelectrolytes of the types described above are ethylenic polymers having numerous side chains distributed along a substantially linear continuous carbon-carbon backbone. The side chains can be hydrocarbon groups, carboxylic acid groups or derivatives thereof, phosphonic acid or derivatives thereof, heterocyclic nitrogen groups, aminoalkyl groups, alkoxy radicals and other organic groups the number of which groups and the relative proportions of hydrophilic and hydrophobic groups being such as to provide a polymeric compound having a substantially large number of ionizable radicals. Said continuous carbon chain must represent a degree of polymerization of at least eight.

For optimum beneficial effect the molecular weight of the basic polymer structure (not taking in account the cross-linking which can lead to infinite molecular weight) is of some importance. It appears that molecular weights in excess of 1000 (degree polymerization of 8) are desirable to obtain satisfactory adsorption of the water-contaminating materials and microorganisms. The optimum molecular weight for a particular polymer depends to a certain extent on the method of air treatment as described below. With some copolymers within the scope of this invention the adsorption effect reaches a maximum at low molecular weights. With others, a maximum may not be reached before molecular weights of 80,000 to one and one-half million, and further increases in molecular weights may not improve the polymer.

Particularly valuable copolymers are those derived from hydrocarbon olefin and maleic acid and the ammonia or amine derivatives thereof. Such copolymers have the formula

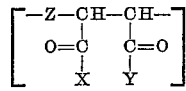

wherein Z is a bivalent hydrocarbon radical of from 2 to 12 carbon atoms, wherein Z is free of aliphatic unsaturation, X and Y are radicals selected from the class consisting of —OH, —$ONH_4$, —$ONRH_3$, —$ONR_2H_2$, —$ONR_3H$, —$ONR_4$, —$NH_2$, —NHR, and —$NR_2$, R being an alkyl radical of from 1 to 18 carbon atoms, or an alkyl radical containing a tertiary or quaternary nitrogen atom and wherein X and Y together may be >NR or >NR, and $n$ is an integer indicative of the degree of polymerization. Preferably, $n$ is an integer having a magnitude of at least 8, and can be as great as 10,000, or more.

One class of presently useful copolymers includes the ammonium and alkylamine salts of maleic acid/$C_2$–$C_{12}$ mono-olefin copolymers, wherein the alkylamine can have from 1 to 18 carbon atoms in the alkyl radical, or can be an aminoalkylamine. Such salts have the formula

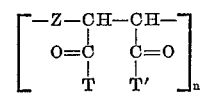

where T is selected from the class consisting of —$ONH_4$, —$ONR_4$, —$ONRH_3$, —$ONH_2R_2$, —$ONHR_3$, —$NH_2$, —NHR, and —$NR_2$, where R is an alkyl radical of from 1 to 18 carbon atoms, or an alkyl radical containing a tertiary or quaternary nitrogen atom, T is selected from the class consisting of T and —OH, and where $n$ and Z are as described above. Copolymers having the above formula include the mono-ammonium or diammonium salts of maleic acid-ethylene copolymer, of maleic acid-propylene copolymer or of maleic acid-1- or 2-butene, isobutylene, or 1-hexene copolymer; the mono- or di-alkylamine salts of such copolymers, e.g., the methyl-, ethyl-, isopropyl-, dodecyl-, hexadecyl- or octadecylamine salts of maleic acid-1-hexene or 1-octene copolymer, the dimethyl-, methylethyl-, diethyl-, di-n-propyl-, di-n-hexyl- or bis-(2-ethylhexyl)amine salt of maleic acid-ethylene, 1-butene, 1-hexene, 1-decene, or 1-dodecene copolymer; and mixed ammonium alkylamine salts such as the ammonium n-propylamine salt or the ammonium dimethylamine salt of maleic acid-ethylene or propylene copolymer.

In the above formula Z, a bivalent hydrocarbon radical, can be an aralkylene radical derived from aromatic-substituted olefins, e.g., styrene, α-methylstyrene, the isomeric vinyltoluenes, vinyl naphthalene. The hydrocarbon chain extending along the polymer backbone can also have other alicyclic substituents attached thereto. Thus Z can be the hydrocarbon radical obtained by the copolymerization of say maleic anhydride with ethylidene cyclohexane, allyl cyclopentane, allyl cyclohexane, or isopropenyl cyclobutane.

Another class of presently-useful copolymers includes the mono- and diamides of maleic acid-ethylene, propylene, isobutylene, 1- or 2-butene, 1-hexene, 1-octene, or 1-decene copolymers as well as the corresponding N-alkyl or N,N-dialkyl amides and their quaternary salts. This class may be represented by the formula:

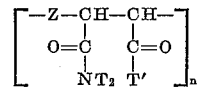

in which Z is a bivalent hydrocarbon radical of from 2 to 12 carbon atoms, T is hydrogen, an alkyl radical of from 1 to 18 carbon atoms, or an alkyl radical containing a tertiary or quaternary nitrogen atom, T' is selected from the class consisting of —$NT_2$ and —OH, and $n$ is an integer indicating the degree of polymerization. As illustrative of copolymers having the above formula may be mentioned the monoamide of maleic acid-ethylene or propylene copolymer, the N-butyl amide of maleic acid-ethylene, isobutylene, or 1-hexene copolymer, the diamide of maleic acid-ethylene, 2-butene, 1-octene or 1-decene copolymer, the N,N'-dimethyl-, N,N'-diethyl, N,N'-di-n-propyl, or N,N'-methylethyl diamide of maleic acid-propylene, butene, hexene or octene copolymer and the N,N,N',N'-tetramethyl-, N,N,N',N'-tetraethyl-, N,N,N',N'-tetra-n-propyl or N,N-dimethyl, N',N'-didodecyl diamide of maleic acid-ethylene, propylene or 1-butene copolymer. When Z is an aralkylene radical, representative copolymers include the half amide of maleic acid-styrene copolymer, the diamide and alkyl-substituted diamides of maleic acid-styrene or α-methyl-styrene copolymer.

Still another class of the presently-useful derivatives of maleic acid/$C_2$–$C_{12}$ mono-olefin copolymers includes the half-ammonium salts, half-amides of the formula:

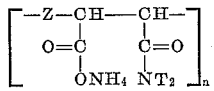

in which T is selected from the class consisting of hydrogen, alkyl radicals of from 1 to 18 carbon atoms, and alkyl radicals containing a tertiary or quaternary nitrogen atom, and Z and $n$ are as herein defined. Representative members of this useful class include the ammonium salt of maleic acid-ethylene or propylene copolymer monoamide, the ammonium salt of maleic acid-ethylene or propylene or propylene copolymer N-methyl-, N-ethyl, N-n-propyl or N-dodecyl or N-octadecyl mono-amide, the ammonium salt of maleic acid-ethylene or propylene copolymer N,N-dimethyl-, N,N-diethyl-, N,N-ethyl-, methyl or N,N-di-n-propyl-mono-amide, and the ammonium salt of maleic acid-styrene copolymer N,N-dimethyl, or N,N-diethylamide.

Also presently useful are the imides of maleic acid/$C_2$–$C_{12}$ mono-olefin copolymers of the formula:

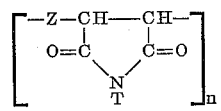

in which T is selected from the class consisting of hydrogen, alkyl radicals of from 1 to 18 carbon atoms, and alkyl radicals containing a tertiary or quaternary nitrogen atom, and Z and $n$ are as herein defined. Examples of imides having the above formula include the imide of maleic acid-ethylene copolymer, the imide of maleic acid-propylene copolymer, the imide of maleic acid-styrene copolymer, the imide of maleic acid-2 butene copolymer or the N-methyl, N-ethyl, N-propyl, N-isopropyl, N-octyl, N-hexadecyl or N-octadecyl derivatives of such imides. Partially imidized copolymers can likewise be used.

A particularly preferred class of derivatives of maleic acid/$C_2$–$C_{12}$ mono-olefin copolymers includes the aminoamides, the aminoimides and salts that can be derived from them. These classes of polyelectrolytes can further be converted to useful polymers containing a quaternary nitrogen atom. The aminoamides can be represented by the formula

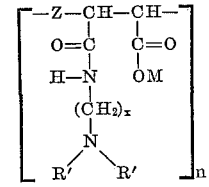

wherein Z and $n$ are as defined above, $x$ is an integer from 1 to 5, R' and R" are each alkyl radicals of from 1 to 5 carbon atoms, and M is hydrogen, ammonium radical, or a metallic ion of an alkali or alkaline earth metal.

The polymeric materials containing the aminoamide linkage as illustrated above can be converted to the corresponding aminoimide by heating at 100 degrees to about 170 degrees centigrade, preferably at 130 degrees to 150 degrees centigrade to give the polymer corresponding to the formula

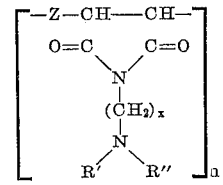

wherein Z, $n$, $x$, R' and R" are as described above.

The aminoamides and aminoimides derived from the maleic acid/$C_2$–$C_{12}$ mono-olefin copolymers are useful in purifying water according to our invention; however, in many instances their efficacy as hydrophilic polyelectrolytes can be further improved by conversion of at least a portion of the tertiary nitrogen atoms to quaternary nitrogen atoms. In certain instances the copolymer containing the tertiary amine linkages can also be employed as the amine hydrohalide salt by treatment with a hydrogen halide, e.g., HCl. The quaternary ammonium derivatives are readily prepared by reaction with an alkyl halide of the formula R'''X, wherein R''' is an alkyl radical of 1 to 18 carbon atoms and X is a halogen atom. Aralkyl halides, such as benzyl halide, can also be used to prepare the quaternary ammonium salts. These useful derivatives can be represented by the formulas

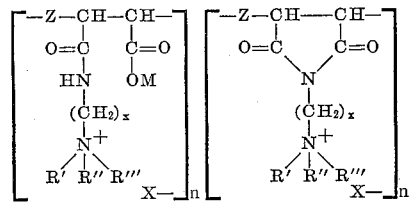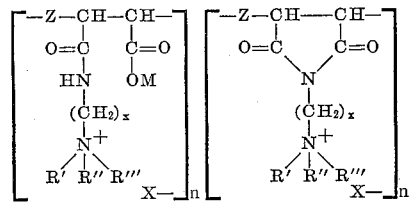

wherein Z, M, $n$, $x$, R' and R" are as described above, R''' is an alkyl radical of 1 to 18 carbon atoms or an aralkyl radical of 7 to 12 carbon atoms and X is a halogen atom. As illustrative of copolymers having the above formulas may be mentioned the diethylaminoethyl amide of maleic acid-ethylene, 1-butene, or styrene copolymer, the dimethylaminopropyl amide of maleic acid-ethylene, 1-hexene, 1-octene, or styrene copolymer, ammonium salt, the dipropylaminoethyl imide of maleic acid ethylene, propylene, or styrene copolymer, the dimethylaminopropyl amide of maleic acid-ethylene, octene, or styrene copolymer, as the methyl iodide quaternary salt, or the octadecyl bromide quaternary salt of diethylaminobutyl imide of maleic acid-ethylene, propylene or styrene copolymer.

The above presently-useful free acids, salts, amides, and half salts-half amides, imides and quaternary ammonium amides and imides of maleic acid $C_2$–$C_{12}$ hydrocarbon monoolefin copolymers are known materials which are obtainable in commerce or by methods well known to those skilled in the art. For convenience, however, a résumé of such methods is given herewith.

In practice, the present hydrophilic derivatives of maleic acid hydrocarbon olefin copolymers are prepared from readily available maleic anhydride hydrocarbon olefin copolymers, for example, as described in the Hanford U.S. Patents 2,378,629 and 2,396,785. Generally, the copolymers are prepared by reacting ethylene, propylene, isobutylene, 1- or 2-butene, 1-hexene, 1-octene, 1-decene, 1-dodecene, styrene, a-methylstyrene, vinyl toluene, or mixtures of these olefins with maleic anhydride in the presence of a peroxide catalyst in an aliphatic or aromatic hydrocarbon which is a solvent for the monomers but is a nonsolvent for the interpolymer formed. Suitable solvents include benzene, toluene, xylene, chlorinated benzene, hexane, acetone and the like. While benzoyl peroxide is the preferred catalyst, other peroxides such as acetyl peroxide, butyryl peroxide, di-tertiary butyl peroxide, lauroyl peroxide and the like or any of the numerous azo catalysts are all satisfactory since they are soluble in organic solvents. The copolymer contains substantially equimolar quantities of the olefin residue and the maleic anhydride residue. The properties of the polymer, such as molecular weight, for example, may be regulated by proper choice of the catalyst and control of one or more of the variables such as ratio of reactants, temperature, and catalyst concentration or the addition of regulating chain transfer agents. The product is obtained in solid form and is easily recovered by filtration, centrifugation or the like. Removal of any residual or adherent solvent can be effected by evaporation using moderate heating.

The maleic anhydride copolymers thus obtained have the formula

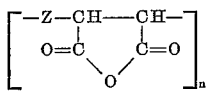

where Z corresponds to a bivalent hydrocarbon radical, free of aliphatic unsaturation, and having the carbon content of the olefin monomer which was used and $n$ denotes the degree of polymerization.

Said anhydride copolymers are readily hydrolyzed by heating with water to yield the acid form of the copolymer:

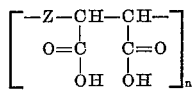

The mono- or diammonium or alkali metal salts can be readily obtained by reacting the copolymer in its anhydride or acid form with the stoichiometric amount of ammonium hydroxide or alkali metal hydroxide. The mono-, di- or tri-alkylamine salts are prepared by reacting the copolymer in its acid form with the appropriate amine, e.g., methylamine, triethylamine or diisopropylamine; whether a mono-salt or a di-salt is formed depends upon whether the quantity of alkylamine used is sufficient to react with both carboxy groups or sufficient only for the neutralization of one carboxy group. Mixed salts, e.g., half-ammonium, half-alkali metal salts are prepared by first reacting with a quantity of alkali metal hydroxide calculated to give the partial alkali metal salt and then reacting the residual free carboxy radical with sufficient ammonium hydroxide to neutralize said radical.

Amides are prepared generally by reacting the finely-divided maleic anhydride/$C_2$–$C_{12}$ olefin copolymer with ammonia gas at ordinary or elevated temperatures. Half-salts, half-amides are first formed by this procedure. Heat is generally liberated in the preparation of the half-ammonium salt, half-amide, and it is thus desirable to provide some means for dissipating it so that the product will not be affected by excessively high temperatures. One effective means for controlling the heat of reaction consists of suspending the solid polymer in an inert organic liquid such as benzene and bubbling ammonia through the slurry.

The polyelectrolytes useful in the practice of this invention are water-insoluble although in many instances it is desired to have the material wetted by water. The materials can be adjusted to give the water-insolubility characteristics by regulation of the type and ratio of hydrophilic to hydrophobic groups, and by controlling the degree of cross-linking. If water-soluble polymer is obtained it will have different microbial retention characteristics.

Cross-linking of a controlled degree can be obtained by polymerizing a small amount of a difunctional monomer along with the other monomers, e.g., maleic anhydride and $C_2$–$C_{12}$ monoolefin. Suitable monomers for this purpose include divinylbenzene, and the vinyl or allyl esters of unsaturated acids, such as vinyl acrylate, vinyl crotonate, vinyl methacrylate, vinyl allyl acrylate, allyl crotonate, and allyl methacrylate. Divinyl benzene is especially suitable for cross-linking styrene/maleic anhydride copolymer, and the vinyl or allyl esters for cross-linking ethylene, propylene or isobutylene/maleic anhydride copolymers. It is generally preferred that from about 0.1 to 10 mole percent of cross-linking agent be used based on the total number of moles of reacting monomers.

As an alternate procedure for the preparation of the three-dimension polymer network, we can advantageously use a difunctional compound for cross-linking preformed maleic acid/$C_2$–$C_{12}$ monoolefin copolymer. By way of example this can be achieved by reaction between the copolymer and a polyamine, e.g., in the reaction of the copolymer with a dialkylaminoalkylamine, from 0.1 to 10 mole percent of the latter can be substituted by the equivalent molar quantity of ethylenediamine. Thus the quantity of cross-linked polymer in the overall polymer can be precisely controlled. It is understood that ethylenediamine is a typical example of a cross-linking reagent, but many other compounds such as the group of alkalene polyamines can be used for this purpose.

Cross-linking of a preformed polymer can also be accomplished by irradiating the polymer with high energy radiation till the desired degree of cross-linking is obtained. High energy alpha rays, electrons, X-rays, gamma rays, neutrons and the like can be used as the high energy radiation for this purpose. Cross-linking of polymers in this fashion is well known in the art.

Yet another way of cross-linking a preformed polymer is by bonding a water-soluble polyelectrolyte to a water-insoluble substrate. This bonding to the substrate can be achieved through covalent, hydrophobic or hydrogen bonding or combination thereof, provided the bonding is sufficient to prevent the polymer from being washed by water from the substrate. The polymer is thereby insolubilized while leaving polymer surface available for purification of air by the process of the invention. This type of cross-linking is described later in this specification wherein a water solution of half-amide half-ammonium salt of styrene-maleic anhydride copolymer (not cross-linked) is bonded to cellulosic filter cloth.

Although we do not intend to limit the scope of our instant invention to any particular theoretical aspect, it appears that there is a logical explanation why our process operates successfully and efficiently. The electrical and chemical nature of infectious agents, such as the bacteria and viruses, results in electrostatic bonds between these agents and the hydrophilic polyelectrolytes. The ion exchange resins are not effective in removing viral contaminants even though these resins often possess hydrophilic groups. The ion exchange resins are ordinarily effective in their designed function because the ions penetrate into the resin sphere; however the comparatively large size of the virus protein molecule prevents its penetration into the adsorbent particle. Therefore, only a very few viruses are adsorbed on the exterior sites of the ion exchange resin. On the other hand, the hydrophilic copolymers of a maleic acid/$C_2$–$C_{12}$ monoolefin derivative possess enormous active surfaces which possess extremely high adsorption capacity. Thus our hydrophilic copolymers, which are prepared in a solvent system which dissolves the comonomers, but which is a nonsolvent for the product copolymer, are obtained in a physical form ideally suited to perform as adsorption agents.

The preferred hydrophilic polyelectrolytes prepared by the solvent-nonsolvent polymerization technique have a surface area of 40 to 50 square meters per gram of polymer. These high values provide a marked contrast to the surface areas of conventional ion-exchange resins which have a surface area of about 0.1 to 1 square meter per gram of resin. Acceptable adsorption efficiency is obtained when the hydrophilic polyelectrolyte has a surface area of at least 10 square meters per gram of polymer. These numerical values are obtained by measuring the quantity of nitrogen adsorbed upon a weighed, degassed sample. The measurement of effective surface area is commonly determined by the B.E.T. test method.

The physical differences between the hydrophilic copolymers useful in the practice of our invention and the conventional ion exchange resins have been confirmed by electron microscopy. The derivatives of maleic copolymers, pulverized to pass a 325 mesh screen, were compared with commercial ion exchange materials which had been similarly pulverized to pass through a 325 mesh screen. Apparently the solvent-nonsolvent polymerization technique used to prepare the maleic copolymers gives them a very small ultimate particle size of about 0.1 micron as measured across the particle image and a porous irregular structure with high surface area (the ultimate particle size is determined by electron microscopy as distinguished from the apparent particle size which is determined by physical processing steps, e.g., sieve size). On the other hand the ion exchange materials have nonporous, smooth surfaces and have ultimate particle sizes in the range of 6 to 25 microns or more. We prefer to employ in the practice of the instant invention the hydrophilic polyelectrolytes derived from a copolymer of an unsaturated polycarboxylic acid derivative wherein the ultimate particle size is less than about one micron as determined by electron microscopy.

Many methods of application of the hydrophilic polyelectrolyte to contaminated oxygen-containing gas to effect purification will be apparent to one skilled in the art. The instant invention is not limited to any particular method of contacting the polyelectrolyte with the oxygen-containing gas to be purified, nor is the invention limited to the representative methods described herein for illustrative purposes.

For a broad spectrum system effective in the removal of many varied microorganisms and contaminating compounds we prefer to contact the oxygen-containing gas with a polyelectrolyte which contains both positive and negative charges, i.e., polyampholytes, although we have found that in certain instances we prefer to employ a polyanionic or polycationic material. We have demonstrated the preparation and activity of these various polymeric derivatives in the examples.

It will be understood that the variables in connection with the polyelectrolyte's state of subdivision, ultimate particle size, amount of cross-linking in the basic copolymer, and hydrophilic-hydrophobic balance depend upon the method to be used for contacting the polyelectrolyte and the contaminated oxygen-containing gas. It is within the skill of the polymer chemist to fix these variables by routine experimentation. For example, if a comparatively low molecular weight polymer having a high proportion of hydrophilic groups is employed, a higher degree of cross-linking is needed to maintain water-insolubility.

An advantageous method of contacting contaminated oxygen-containing gas with our preferred hydrophilic polyelectrolytes involves the passage of oxygen-containing gas through a bed or column of the polyelectrolyte. For example, a finely divided inert material can be coated with the copolymer derivative in its two dimensional form which can be subsequently converted to three dimensional form. Another method of preparing a useful filter medium consists of chemically reacting a portion of the functional groups of the polyelectrolyte with the material composing the filter, e.g., the hydroxyl groups of a cellulosic filter medium can be used to esterify part of the carboxylic groups of the copolymer. The carboxylic acid groups of the copolymer can also react with the

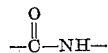

groups of nylon.

As an example of the method of treating oxygen-containing gas wherein the hydrophilic polyelectrolyte is chemically bound to a filter medium, the following technique can be employed. Cellulosic filter cloth can be saturated with a solution of the half amine-half ammonium salt of styrene-maleic anhydride copolymer and reaction between the cloth and copolymer brought about by thermal curing at 100–150 degrees centigrade for 1 to 6 hrs. The polymer pickup by the cloth can be varied from about 1 to 10% of the weight of cloth by control of polymer dilution, pressing, after rinse, etc. The contaminated oxygen-containing gas can then be filtered through multiple layers of this treated cloth to effect adsorption of the contaminants. The filter medium can be regenerated by treatment with brine or steam and reused. The regeneration treatment does not chemically alter the polyelectrolyte but removes the adsorbed contaminants, e.g., brine interferes with the electrostatic bonds holding the viruses or bacteria to the polyelectrolyte.

Oxygen-containing gas purification, according to our invention, can be carried out on a continuous basis by the use of polyelectrolyte packed columns. One preferred type of operation involves backflow operation wherein solid polyelectrolyte is fed to the top of the column, contaminated oxygen-containing gas is fed to the bottom of the column and saturated polyelectrolyte is withdrawn from the bottom of the column and cycled to an activation or regeneration step or else discarded. The contaminated oxygen-containing gas flows countercurrent to the polyelectrolyte flow, entering the bottom of the column and passing out of the top of the column in a purified state. Further modifications of columnar operation involving combinations of parallel and/or series-related columns are possible and well within the scope of this invention.

In place of adsorbents prepared by coating an inert substrate with a hydrophilic polyelectrolyte we can use adducts having an electrostatic or chemical bond between the copolymer derivative and a clay. Clays suitable for this purpose include the bentonites, montmorillonites, kaolins, and attapulgites. The copolymer derivatives having an amino function are particularly valuable in preparing these clay adducts which can then be used as filter media or as packing for a column.

In general, this process for the treatment of microbiologically-contaminated air utilizes products analogous to those described in the treatment of contaminated waters. Here, certain modifications of conventional and commercial air scrubbing and filtration equipment renders them suitable for the practice of this invention. For example, conventional dry mat-type air filters may be modified to effectively remove microbiological contamination by coating their air-contact surfaces with polyelectrolyte having affinity for viruses and bacteria. Here it is desirable to convert the polymeric derivative to its insolubilized form after the surfaces have been coated. This is achieved by preparation of the intermediate half-amide form as previously described. This is dissolved in an appropriate solvent or mixed solvents consisting of for example, ketones such as methyl ethyl ketone, N-substituted carboxamides, dimethyl formamide, sulfoxides such as dimethyl sulfoxide, followed by evaporation of the solvent leaving the surface coated with a film of the polymer derivative. The coated filter is then heated to 150 degrees centigrade for a period of 4–12 hours to convert the half-amide derivative to the desired imide. Alternatively, the half-amide derivative is used directly as the adsorbent after first insolubilizing by treatment with a diamine such as ethylene diamine. This method is particularly useful in reducing contamination of air in private homes and is readily adaptable to normal air circulating systems. For maximum efficiency it is desirable to insert a roughing filter prior to the treated filter and to maintain the humidity of the air stream above 50 percent. In winter months or dry climate, this is accomplished by incorporating any one of several commercial-type humidifiers in the air stream prior to its passage through the filters described above.

Our novel process can also be used in the removal of microorganisms from hospital air and in particular the air in operating rooms. Current systems at best reduce bacterial population and have a low efficiency in removal of particles below one micron in size, with all viruses having particle sizes in the range of 0.3 micron and below. The ability of our polymeric adsorbents to interact with and remove virus from contaminated media has been clearly demonstrated. Utilization of these principles in scrubbing all hospital air minimizes spread of infections. The importance of air-borne microbial infection in hospital management is emphasized in several publications.

This invention is also applicable to water scrubbing systems which are frequently used in office, hospital and factory installations. Here, the efficiency of removal of viruses from air is conveniently demonstrated through use of bacteriophage, which are viruses infecting bacteria and are non-infections to man.

These and other aspects of the practice of our purification process will be readily understood by those skilled in the art after reviewing our complete specification. In order to illustrate some of the various aspects of the invention and to serve as a guide in applying the invention, the following specific examples are given. It will of course be understood that variations in the particular copolymers and their derivatives, method of application, and conditions for use can be made without departing from the invention. Unless otherwise noted all temperatures are in degrees centigrade and all parts are parts by weight.

EXAMPLE 1

This example illustrates the preparation of a typical maleic acid/$C_2$–$C_{12}$ monoolefin copolymer useful in the preparation of active adsorbent derivatives. A 3-liter glass reactor, fitted with reflux condenser and motor-driven stirring device is charged with 52.3 g. of maleic anhydride, 55.7 g. of styrene, 1500 ml. of benzene, 2.53 g. of 55% active divinyl benzene, equivalent to 1.39 g., or 1 mol percent of active cross-linking agent, and 0.275 g. of benzoyl peroxide. The reactants are heated to the temperature of refluxing benzene and maintained at this temperature with good mixing for 3.5 hours. The polymer is filtered, washed upon the filter with benzene and finally dried in the vacuum oven for 16 hours at 100 degrees centigrade. An essentially quantitive yield of cross-linked styrene/maleic anhydride copolymer is obtained.

EXAMPLE 2

A predetermined percentage of anhydride groups in the maleic anhydride copolymer, such as prepared in Example 1, can be converted to substituted imide groups by a simple two-step process. To prepare a product containing 50% imide linkages, 0.5 molar unit of styrene maleic anhydride polymer from Example 1, is charged to a glass 1 liter reactor fitted with mechanical stirrer and graduated water trap topped by a reflux condenser. The reactor is then charged with 500 ml. dry xylene and 0.25 mol of a dialkylaminoalkylamine added. A representative amine of this class is the dimethylaminopropylamine. As the reactants are gently warmed with good mixing, the anhydride linkage is opened and the N-substituted amide formed. Heating is continued and the temperature raised to reflux the xylene and to carry off azeotropically the water of reaction as the imide linkages form.

After the theoretical quantity of water has been distilled from the reactor, the solvent is stripped off under reduced pressure and the product copolymer derivative dried in a vacuum oven.

EXAMPLE 3

The copolymer from Example 2 containing 50% substituted imide linkages is suitable for purifying air by our process. For certain applications a copolymer having a percentage of quaternary salt hydrophilic groups can be prepared by reacting the substituted imide with an alkyl halide. It is possible to convert a calculated proportion of the tertiary nitrogen atoms to quaternary nitrogen atoms by the simple method of warming a suspension of the polymer with a calculated amount of alkyl halide. An inert diluent such as benzene can be employed for the preparation of the quaternary ammonium derivatives. A calculated weight of the imide substituted copolymer, as prepared in Example 2, is suspended in benzene to which is added an alkyl halide. The reaction proceeds readily at temperatures from 40 to 60 degrees centigrade when a halide such as methyl iodide is employed. A reaction period of 30 minutes or less is usually sufficient when an active halide such as a benzyl halide or a lower alkyl halide is employed. If the halide be a chloride, the reaction time is somewhat longer than if the halide portion of the molecule be bromide or iodide. After the heating period is completed, the diluent is stripped off at reduced pressure and the polymer dried in a vacuum oven.

EXAMPLE 4

The hydrophilic properties of the various copolymers suitable for the practice of our invention can be increased by an ammoniation step. Ammonia gas is used to convert unreacted anyhdride linkages in the copolymer to the half-amide, half-ammonium salt. This reaction can be carried out by adding ammonia to the dry polymer while using thorough mixing, or the ammonia can be added to a suspension of the copolymer in an inert diluent such as benzene. The ammoniation step is successfully conducted using copolymer as prepared, or can be carried out with a derivative of the copolymer, e.g., copolymer containing imide linkages, copolymer containing substituted imide linkages, or copolymer containing quaternary ammonium compounds prepared from the partial imides.

The ammoniation reaction is accompanied by a temperature rise and proceeds rapidly to 100% conversion of the anhydride linkages. If the reaction is conducted with the dry polymer, excess adsorbed ammonia is stripped from the polymer by treating it under reduced pressure to remove the ammona. If the ammoniation is conducted with a polymer suspension, excess ammonia is removed along with the inert diluent which is stripped off under reduced pressure.

EXAMPLE 5

In this example polymers with variations in the cross-linking and type of hydrophilic groups are made which do not adversely affect the viral adsorption capacity of the polyelectrolyte. Each of the derivatives in this series is screened to select polymeric material that passed through a 325 mesh screen.

A styrene-maleic anhydride copolymer is prepared according to the procedure of Example 1 but with the exception that one-half mole percent of divinylbenzene is employed, in place of the 1 mole percent of Example 1, based on total monomers charged. This copolymer is used to prepare a series of polyelectrolytes for viral adsorption studies.

A. The copolymer is heated with a quantity of dimethylaminopropylamine sufficient to convert 50% of the anhydride linkages to imide linkages containing a pendant group having a tertiary nitrogen atom in the chain.

B. A second portion of the copolymer is heated with a quantity of dimethylaminopropylamine sufficient to convert 100% of the anhydride linkages to imide linkages containing a pendant group having a tertiary nitrogen atom in the chain.

EXAMPLE 6

A styrene-maleic anhydride copolymer is prepared according to the procedure of Example 1 but with the exception that two mole percent of vinyl crotonate is employed, in place of the 1 mole percent of Example 1, based on total monomers charged. This copolymer is used to prepare a series of polyelectrolytes for viral adsorption studies.

A. The copolymer is heated with a quantity of dimethylaminopropylamine sufficient to convert 100% of the anhydride linkages to imide linkages containing a pendant group having a tertiary nitrogen atom in the chain.

B. A portion of the 100% imide derivative as a benzene slurry, from 6-A, is converted to the hydrochloride salt of the tertiary amine with gaseous hydrogen chloride. Excess hydrogen chloride is removed under reduced pressure as the benzene was stripped from the product. This hydrophilic polyelectrolyte is water insoluble, and had a high degree of activity in adsorbing TMV for water as 97% was adsorbed under the above test conditions.

C. The pendant tertiary amino groups in a copolymer, similar to 6-A except only 50% imide conversion, is converted to quaternary nitrogen derivatives by reaction with methyl iodide. This copolymer derivative, while having strong hydrophilic groups, retains its water insoluble characteristics.

EXAMPLE 7

A styrene-maleic anhydride copolymer is prepared in the presence of one-half mole percent of divinylbenzene as described in Example 5. This cross-linked material is heated with dimethylaminopropylamine in xylene in a calculated attempt to convert 2/3 of the anhydride linkages to imide linkages. A quantity of the copolymer equivalent to 3 times the unit molecular weight is heated with a quantity of amine equivalent to 2 times the molecular weight of the amine. The product contains 6.67% nitrogen indicating a conversion to imide linkages of 60.2%. A portion of this product is screened and the material passing through a 250 mesh screen and retained on a 270 mesh screen is tested for viral adsorption properties.

EXAMPLE 8

A sample of the copolymer derivative from Example 7 is treated with ammonia gas under anhydrous conditions at room temperature to open the anhydride linkages, thus converting them to the half-amide, half-ammonium salt. The ammoniated product is stored in a vacuum oven for 48 hours to remove adsorbed free ammonia. This hydrophilic polyelectrolyte is water insoluble, although it was slightly swollen by water.

EXAMPLE 9

A separate sample of the copolymer derivative of Example 7 is reacted with a quantity of methyl iodide, equivalent to the analyzed quantity of tertiary nitrogen atoms in the pendant imide substituent. The quaternary ammonium derivative forms readily at 40-45 degress centigrade in a benzene slurry. The diluent is stripped off under reduced pressure and the dried polyelectrolyte that passes a 250 mesh screen and is retained on a 270 mesh screen is selected for an adsorption test under severe conditions.

The following describes the preparation of a radioactive phage aerosol for use in demonstrating the effectiveness of the subject polymers in adsorbing and removing virus from air. Contacting procedure and method of assay for this example are also presented.

EXAMPLE 10

*Preparation of radioactive phage*

A homogeneous aerosol is generated by atomizing a dilute aqueous suspension of purified T-2r bacteriophage and evaporating the water away from the virus in a stream of dry air. The average diameter of this virus is 0.08 micron and its Brownian diffusion coefficient, $D_{BM}$, in air at 25 degrees centigrade is $10^{-5}$ sq. cm. per second by calculation. The phage is grown within the cells of its specific host, *Escherichia coli* B, a strain of the common colon bacillus. The phage particles are tagged with radioactive phosphorus, which serves as a tracer and eliminates the need for maintaining the viability of the virus.

The host cells are grown in a medium containing 2% proteose peptone (Difco), 0.1% glucose, and 0.5% sodium chloride. During phage production, the host cells show no preference for either the stable or the radioactive phosphorus isotope; therefore, the final level of radioactivity in the phage depends on the specific activity of the growth medium. High specific activities of radiophosphorus are obtained by depleting the growth medium of orthophosphate by calcium precipitation prior to the addition of carrier-free phosphorus-32 phosphate.

The production of phage causes lysis or dissolution of the host cells and results in a clearing of the bacterial culture. After lysis has occurred, the phage suspensions are separated from bacterial debris by alternate low speed-high speed cycles of centrifugation, followed by gradient centrifugation. The latter technique consists of centrifugation at approximately 95,000 times gravity through a density and viscosity gradient composed of layers of various concentrations of sucrose. As the settling velocity in a centrifugal field is proportional to the difference in density between the particles and the medium, and inversely proportional to the viscosity of the medium, uniform particles will move down the centrifuge tube in narrow bands. The phage particles are separated from the sucrose by two cycles of high speed centrifugation in distilled water. The radioactivity of the phage particles is determined by the method of Hershey and others (Hershey, A. D., Kamen, M. D., Kennedy, J. W., Guest, H., J. Gen. Physiol., 34, 305–19 (1951)), in which the number of viable radioactive virus particles is related to the rate of radiodecay of the phosphorus-32 and the efficiency of phage inactivation per atomic disintegration.

*Introduction of the phage aerosol*

The aerosol generator is similar to that described by Ferry (Ferry, R. M., Farr, L. E., Jr., Hartman, M. G., Chem. Revs., 44, 389–417 (1949)), for the preparation of bacterial aerosols. Air from the laboratory lines is cleaned by passage through a ceramic filter and a cotton filter. The air stream is then divided and the separate streams are humidified and dried. The nebulizer is operated at a pressure drop of 1.85 pounds per square inch with a flow rate of 3 liters of moist air per minute. Under these conditions, 0.035 cc. of phage suspension is sprayed per minute with an average water droplet size of approximately 15 microns. The atomized phage enter the top of the mixing chamber, while the dry air is introduced tangentially at a flow rate of 5–10 liters per minute. The resulting turbulence provides excellent mixing of the streams.

*Procedure for scrubbing contaminated air*

The air-borne phage is contacted with the adsorbent polymer surfaces, which are suspended in the scrub water, using one of the following types of equipment, each representing a useful engineering principle of liquid-vapor contacting: (1) batch, (2) continuous stirred batch, (3) continuous counter-current, and (4) continuous cocurrent. The effluent air stream from these scrubbers is then passed through a thermal precipitator to collect and detect any residual phage via radioactive measurements. By similarly monitoring the input or contaminated air stream, it is possible to calculate the total radioactive phage load on the filters and the percentage of this load which escapes the filter. This thermal precipitator is operated to obtain 100% collection efficiency of air-borne particles, which, in this equipment (see reference Gordon, M. T., Georgia Inst. Technol., Research Engr., 7, 9–10, 22–4 (1953), for detailed description) necessitated the use of a gradient of 8000 degrees centigrade per inch. The precipitator consists of two circular plates, one at 20 degrees centigrade and the other at 100 degrees centigrade, separated by 0.01 inch. To accommodate the capacity of this precipitator (about 300 cc./min.), only a calculated fraction of the air stream is by-passed through the device using a radial flow between the hot and cold surfaces. The cold plate is a hollow brass disk through which cooling water is circulated. The hot plate is heated by a Chromalux disk heater controlled by a Variac transformer. The particles are collected on a No. 2 glass cover slip (3 inches in diameter) lying on the cold plate. Radioactivity of the collected particles is measured and by calculation related to the total of the effluent and influent streams.

The operation of these processes listed above is described as follows: (1) In the batch operation, the phage-contaminated air stream is fed to the bottom of a pipe contactor through a gas sparger. The laboratory apparatus consists of a pipe 1 inch in diameter and 36 inches in length equipped with a standard demister ahead of the gas exit. This is filled ⅔ full with a 5 percent aqueous suspension of the crosslinked styrene/maleic anhydride copolymer derivative described in Example 5-A. The total volume of air flow is adjusted to 12 liters/minute and the test maintained for 10 mins. Water vapor and entrained particles (including any phage) are stripped from a 300 ml./min. sample stream of the effluent air by use of the thermal precipitator and analyzed for radioactivity. The polymer suspension is filtered and the filtrate analyzed for radioactivity. One tenth of a percent of the total radioactivity input is found to escape in the effluent stream. No radioactivity is found in the filtrate of the polymer suspension. By using three of these contactors in series, radioactivity in the effluent air resulting from entrained phage particles is not detectable. (2) The apparatus illustrative of a continuous stirred tank process is an enclosed 1 gallon capacity vessel equipped with a gas dispersion turbine enclosed in a shroud ring. The inlet gas sparger is located directly below this turbine. A standard demister device is located in the gas exit line. A 2 percent aqueous suspension of the polymer described in Example 5-B is fed continuously during the reaction and withdrawn from the bottom of the vessel at the same rate. The vessel is filled with ¾ gallon of polymer suspension. Air is introduced at at rate of 12 liters per minute and slurry at a rate of 1 gallon per hour. Reaction time is 30 minutes. Radioactivity assay, as described above, shows no phage particles in the effluent air or in the filtrate from the continuously withdrawn polymer slurry. (3) The continuous countercurrent contacting is conveniently carried out in a 1 inch diameter and 12 inch in length Oldershaw column having 10 plates. This type of column is detailed in Ind. Engr. Chem., Analytical Edition, 13, 265 (1941). The column for this experiment is made of stainless steel with stainless steel plates. The water-polymer slurry (5 percent aqueous suspension of polymer of Example 6-B) is introduced at the top of the column at a rate of 500 ml./hr. and withdrawn from the bottom of the column at the same rate. The phage-bearing air is introduced at the bottom of the column at a rate of 12 liters/min. Entrainment of large droplets of water is again prevented by a demister installed at the top of the column ahead of the effluent air stream. The experiment is run for 20 minutes. Radioactivity assay shows no phage in the effluent air and none in the filtrate from the effluent polymer slurry. (4) Continuous concurrent scrubbing is conducted in a 1 inch x 24 inch horizontal pipe reactor provided with a series of 24 staggered baffles designed to produce a high tortuosity in order to produce optimum turbulence and mixing. Contaminated air and polymer slurry (1 percent aqueous suspension of polymer of Example 7) are fed from the same end of the reactor; air at 8 liters/min. and slurry at 4 liters/hr., with the total test operation time of 1 hour. The effluent mixture is fed to a continuous gas-liquid separator with a sample stream of the gas being passed through the thermal precipitator as previously described. The assay shows no phage in the exit air and none in the slurry filtrate.

Control runs in the above processes resulted in radioactivity in the effluent air proportionate to the total volume of which the phage was dispersed. When the radioactivity of the filtered water was measured and summated with that of the condensate, greater than 99% of the total introduced could be accounted for.

The polymer content of the foregoing aqueous polymer suspensions may be varied as desired to achieve optimum efficiency with a particular polyelectrolyte of this invention. Preferably the polymer will be employed in an amount between 0.5 and 10 percent by weight and more preferably between 1 and 5 percent.

What is claimed is:
1. A process for purifying air which comprises
   (1) contacting air containing viruses, bacteria and other microorganisms with an absorbent hydrophilic polyelectrolyte having a molecular weight of at least 1000 in the basic polymer structure and of the formula

$$\left[ \begin{array}{c} -Z-CH-CH- \\ | \quad\quad | \\ O=C \quad C=O \\ | \quad\quad | \\ X \quad\quad Y \end{array} \right]_n$$

wherein
   Z is a bivalent hydrocarbon of from 2 to 12 carbon atoms,
   X and Y are selected from the group consisting of $-OH$, $-ONH_4$, $-ONHR_3$, $-ONH_2R_2$, $-ONH_3R$, $-ONR_4$, $-NH_2$, $-NHR$, $-NR_2$ and alkali metals,
   R is selected from the group consisting of alkyl of from 1 to 18 carbon atoms, alkyl containing a tertiary nitrogen atom, alkyl containing a quaternary nitrogen atom, and
   X and Y taken together can be selected from the group consisting of $>NH$, $>NT$ and $>NR$, and
   T is selected from the group consisting of

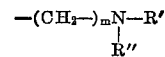

and

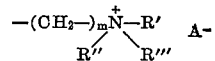

R' and R" are alkyl from 1 to 5 carbon atoms,
   R''' is an hydrocarbon of from 1 to 18 carbon atoms,
   m is an integer from 1 to 5,
   n is an integer having a magnitude of at least 8, and
   A is a halide cation; and
(2) recovering the air substantially free of viruses, bacteria and other microorganisms.

2. The method according to claim 1 wherein the air to be purified is contacted with the polyelectrolyte by passing the air through a column containing the polyelectrolyte.

3. The method according to claim 1 wherein the air to be purified is contacted with the polyelectrolyte by passing the air through an aqueous dispersion of the polyelectrolyte.

4. The method according to claim 1 wherein the air to be purified is contacted with the polyelectrolyte by passing the air through a filter which has been previously coated with the polyelectrolyte.

5. The process of claim 1 wherein the hydrophilic polyelectrolyte is derived from an ethylene-maleic anhydride copolymer.

6. The process of claim 1 wherein the hydrophilic polyelectrolyte is derived from a styrene-maleic anhydride copolymer.

7. The process of claim 1 wherein the hydrophilic polyelectrolyte consists essentially of the N-substituted imide of a styrene-maleic anhydride copolymer.

8. The process according to claim 1 wherein the polyelectrolyte copolymer is crosslinked.

9. The process according to claim 1 wherein the polyelectrolyte copolymer consists essentially of the dimethylaminopropylimide of a styrene-maleic anhydride copolymer which is crosslinked with about one molar percent divinyl benzene.

References Cited

UNITED STATES PATENTS

| | | | |
|---|---|---|---|
| 1,214,154 | 1/1917 | Gustavson | 55—279 X |
| 2,625,529 | 1/1953 | Hedrick et al. | 210—54 X |
| 2,687,374 | 8/1954 | Mowry et al. | 210—36 |
| 3,056,247 | 10/1962 | Pindzola et al. | 55—97 |

FOREIGN PATENTS 715,369   9/1954   Great Britain.

REUBEN FRIEDMAN, *Primary Examiner.*

SAMIH H. ZAHARNA, *Examiner.*

J. ADEE, *Assistant Examiner.*